Patented Nov. 24, 1936

2,061,601

UNITED STATES PATENT OFFICE 2,061,601

PROCESS OF PREPARING ALCOHOL-AMINE MINERAL OIL SULPHONATES

Karl T. Steik, Elizabeth, N. J., assignor to Standard Oil Development Company, a corporation of Delaware No Drawing. Application June 20, 1929, Serial No. 372,529

7 Claims. (Cl. 87—5)

This invention relates to a novel emulsifying agent and the method of preparing it. The invention will be fully understood from the following description:—

It is an old practice in the refining of oils to treat the oil with strong sulfuric acid. Such treatment is usual in the refining of lubricating oils, in the preparation of the so-called "white oils", etc. The strong sulfuric acid causes sulfonation of certain hydrocarbons. These sulfonic acids derived from petroleum are partly soluble in the oil, partly insoluble. The former remain dissolved in the petroleum oil while the latter are found in the sludge. We take the acid oil containing oil soluble sulfonic acids and neutralize it with ethanol-amine or with some other alcohol-amine. The ethanol-amine is obtainable on the market in the form of a glycerine-like viscous liquid and usually consists of a mixture of mono-, di-, and tri-ethanol-amine. I may use other alcohol-amines in my process such as, for instance, propanol-amines, etc. The neutralization is carried out by adding the amine to the oil in small quantities at a time until the oil shows a slightly alkaline reaction. During this operation the oil is vigorously agitated and the temperature is raised slowly to about 80° C. After the neutralization is completed the agitation is continued for about two hours. At the end of this time the oil should still show alkaline reaction, if not, more ethanol-amine is added. The oil is then allowed to settle, preferably over night. The bulk of the ethanol-amine soaps formed with the sulfonic acids separates out and the rest may be washed out with water or with some organic solvent such as isopropyl alcohol, etc.

The amount of alcohol-amine necessary for the neutralization depends on the nature of the amine employed, the percentage of sulfonic acids present in the acid oil, and may vary within wide limits. But this amount can be easily determined in each case since it is necessary to determine only the point when the reaction of the oil becomes alkaline.

The consistency and the color of these soaps may vary within quite wide limits. The crude soaps may have the consistency of bees wax at room temperature when they are obtained from an oil of about 225-250 Saybolt viscosity at 100° F., or they may be like a thick syrupy liquid when obtained from an oil of 80-100 viscosity. The color of these soaps depends on the degree of purification of the oil previous to precipitating out of the sulfonic acids in form of the soaps, and it may vary from light amber to dark red.

The sulfonic acid soaps of the alcohol-amines are good emulsifying agents for oil-in-water type emulsions and we have found that their effectiveness is increased by the presence of an oil-soluble sulfonic compound, namely, sulfonic acid or a salt, such as alkali sulfonate, sodium sulfonate, etc., formed therefrom by reaction with an inorganic base. Such admixture has the effect of increasing the solubility of the alcohol-amine sulfonic acid soaps in oil. This novel emulsifying agent is claimed in co-pending application Serial No. 725,086, filed May 11, 1934, as a continuation in part of the present application.

This invention is not to be limited by any theory or details given in way of illustration but only by the appended claims in which it is our intention to claim all novelty inherent to this invention.

I claim:

1. The process which comprises treating a petroleum oil with strong sulfuric acid to cause sulfonation of certain hydrocarbons in the oil, removing the resultant acid sludge, and treating the remaining acid oil with an alcohol amine.

2. Process according to claim 1, in which the amount of alcohol amine used is sufficient to neutralize the acid oil.

3. The process of preparing alcohol amine soaps of oil-soluble sulfonic acids derived from petroleum, which comprises treating a petroleum oil with strong sulfuric acid to cause sulfonation of certain hydrocarbons in the oil, removing the resultant acid sludge, treating the remaining acid oil with an alcohol amine, and separating the resultant alcohol amine sulfonate soaps from the oil.

4. Process according to claim 3, in which the alcohol amine is added to the acid oil in small quantities at a time until the oil shows a slightly alkaline reaction.

5. Process according to claim 3, in which the soaps are separated from the oil by settling.

6. Process according to claim 3, in which the soaps are separated from the oil by extraction with a suitable solvent of the group comprising water and organic solvents such as isopropyl alcohol and the like.

7. Process according to claim 1 in which the alcohol amine used is triethanolamine.

KARL T. STEIK.